United States Patent
Dai et al.

(10) Patent No.: US 11,550,765 B1
(45) Date of Patent: Jan. 10, 2023

(54) PRE-MIGRATION DETECTION AND RESOLUTION OF ISSUES IN MIGRATING DATABASES SYSTEMS

(71) Applicant: SAP SE, Walldorf (DE)

(72) Inventors: Xia-ge Dai, Shanghai (CN); Zheng-Wei Wang, Shanghai (CN); Weizhong Qiu, Shanghai (CN); Jian Luo, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/487,026

(22) Filed: Sep. 28, 2021

(51) Int. Cl.
*G06F 16/21* (2019.01)
*G06F 16/2453* (2019.01)
*G06F 11/34* (2006.01)

(52) U.S. Cl.
CPC ...... *G06F 16/214* (2019.01); *G06F 16/24542* (2019.01); *G06F 11/3414* (2013.01)

(58) Field of Classification Search
None
See application file for complete search history.

(56) References Cited

U.S. PATENT DOCUMENTS

| | | | |
|---|---|---|---|
| 8,954,574 B1 * | 2/2015 | Chheda | H04L 41/0816 709/224 |
| 9,703,554 B2 | 7/2017 | Eberlein et al. | |
| 2007/0214104 A1 * | 9/2007 | Miao | G06F 16/24542 |
| 2014/0344395 A1 | 11/2014 | Alexander | |
| 2016/0078089 A1 * | 3/2016 | Hu | G06F 16/21 707/714 |
| 2017/0093640 A1 | 3/2017 | Subramanian et al. | |
| 2019/0251180 A1 * | 8/2019 | Lachambre | G06F 16/258 |
| 2019/0253485 A1 | 8/2019 | Jyoti Banerjee | |
| 2020/0007457 A1 | 1/2020 | Greenstein et al. | |
| 2020/0218734 A1 * | 7/2020 | Stennett | G06F 16/242 |
| 2021/0357407 A1 * | 11/2021 | Bok | G06F 11/3409 |

OTHER PUBLICATIONS

U.S. Appl. No. 17/142,370, filed Jan. 6, 2021, Eberlein et al.
U.S. Appl. No. 17/471,338, filed Sep. 10, 2021, Eberlein et al.
Archive.sap.com [online], "LSMW (Legacy System Migration Workbench)" Sep. 2020, [retrieved on Sep. 30, 2020], retrieved from: URL <https://archive.sap.com/documents/docs/DOC-26159>, 4 pages.

* cited by examiner

*Primary Examiner* — Christopher J Raab
(74) *Attorney, Agent, or Firm* — Fish & Richardson P.C.

(57) ABSTRACT

Implementations include providing, by a computer-executed migration advisor executing within a run-time of a source database system, a query data set including queries processed by the source database system during production use of the source database system, providing, by the migration advisor, an object data set including data representative of database objects stored within a database of the source database system, generating, by the migration advisor, a list of query-level features and a list of object-level features, each feature in the list of query-level features and each feature in the list of object-level features including a feature that is deprecated in a target database system, resolving one or more issues represented by features of one or more of the list of query-level features and the list of object-level features, and executing migration of the database of the source database system to the database of the target database system.

20 Claims, 5 Drawing Sheets

PRE-MIGRATION DETECTION AND RESOLUTION OF ISSUES IN MIGRATING DATABASES SYSTEMS

BACKGROUND

Enterprises use database systems in support of operations. For example, enterprises store data within and access data from a database maintained within a database system and execute analytics on data within database systems. Vendors provide disparate offerings of database systems, which enterprises can choose from. Example offerings include, without limitation, on-premise database systems and cloud-based database systems. An on-premise database system can be described as being located within the physical confines of an enterprise (e.g., in a data center owned by and/or operated on behalf of an enterprise), is managed by the enterprise, and is generally capable of being tailored to the specific needs of the enterprise. A cloud-based database system can generally be described as being located within a cloud platform that is operated by a service provider and, in some cases, can have limited options available for tailoring to the needs of a particular enterprise. In many instances, an enterprise may seek to migrate a database between database systems. For example, an enterprise can maintain a database within an on-premise database system, then choose to migrate the database to a cloud-based database system to, for example, take advantage of technical flexibility and reduced total cost of ownership (TCO) cloud-based database systems offer.

Migrating a database from one database system to another database system present numerous technical challenges. For example, even if the database systems are provided by the same vendor, incompatibilities are inherent between disparate types of database systems. An example incompatibility can include, without limitation, disparate features sets as between database systems. That is, for example, a source database system (i.e., a database system, from which a database is to be migrated) can have a feature set that is different than a feature set of a target database system (i.e., a database system, to which a database is to be migrated). For example, the feature set of the target database system can be absent features that are available in the feature set of the source database system (e.g., the feature set of the target database system is deprecated). This deprecation of the feature set of the target database system can result in queries that were executed in the source database system not being executable in the target database system. Other incompatibilities can include database objects available in the source database system not being available in or compatible with the target database system.

In view of this, database migration can be assisted by a set of migration tools that assist users (e.g., IT personnel of an enterprise) in managing migration of a database from one database system to another database system. Traditional migration tools, however, rely on user input to the tools, the user input representing queries, database objects, and the like, of the database within the source database system. Such user input, however, can be incomplete and/or inaccurate, resulting in an inaccurate evaluation of any potential migration issues, which hinders the migration process. For example, an inaccurate view of potential migration issues results in some migration issues not being resolved before migration and having to be unwound post-migration. This comes at the expense of not only time, but technical resources in resolving the issues post-migration.

SUMMARY

Implementations of the present disclosure are directed to migration of databases between database systems. More particularly, implementations of the present disclosure are directed to a migration advisor for detection and resolution of issues arising in migration of databases between database systems.

In some implementations, actions include providing, by a computer-executed migration advisor executing within a run-time of a source database system, a query data set including queries processed by the source database system during production use of the source database system, providing, by the computer-executed migration advisor, an object data set including data representative of database objects stored within a database of the source database system that are to be migrated for storage in a database of a target database system, generating, by the computer-executed migration advisor, a list of query-level features and a list of object-level features, each feature in the list of query-level features and each feature in the list of object-level features including a feature that is deprecated in the target database system relative to the source database system, resolving one or more issues represented by features of one or more of the list of query-level features and the list of object-level features, and executing migration of the database of the source database system to the database of the target database system. Other implementations of this aspect include corresponding systems, apparatus, and computer programs, configured to perform the actions of the methods, encoded on computer storage devices.

These and other implementations can each optionally include one or more of the following features: the query data set includes queries received in one or more of real-time in response to execution, from a plan cache of the source database system, and from a workload of the source database system that has been recorded; for each query, the query data set includes one or more of an abstract syntax tree (AST) and a query execution plan (QEP) for the query; actions further include, for at least one query in the query data set, generating a rewritten query that is absent a query-level feature that is deprecated in the target database system; generating, by the computer-executed migration advisor, a list of query-level features and a list of object-level features includes processing queries of the query data set through one or more computer-executable rules that identify query-level features deprecated in the target database system, and processing queries of the query data set through one or more computer-executable rules that identify object-level features deprecated in the target database system; resolving one or more issues represented by features of one or more of the list of query-level features and the list of object-level features includes one or more of removing a query from a workload that is to be processed by the target database system, replacing a query with a rewritten query in a workload that is to be processed by the target database system, changing a data type of a database object with a data type that is supported in the target database system, and removing a column from a view; and executing migration of the database of the source database system to the database of the target database system includes configuring the database of the target database system and copying the database objects from the database of the source database system to the database of the target database system, the database object being absent object-level features in the list of object-level features.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
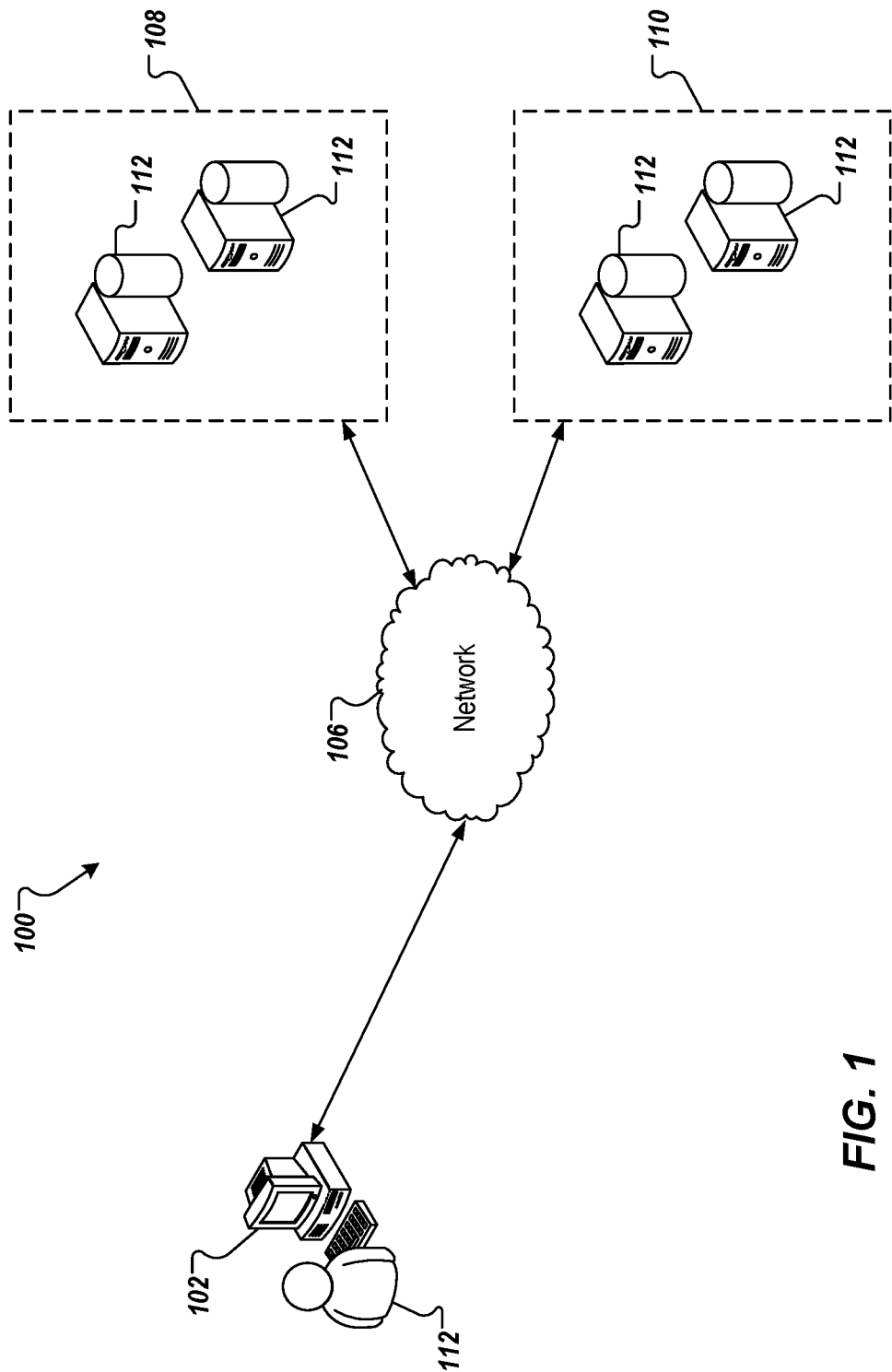
FIG. 1 depicts an example architecture in accordance with implementations of the present disclosure.

Implementations of the present disclosure are directed to migration of databases between database systems. More particularly, implementations of the present disclosure are directed to a migration advisor for detection and resolution of issues arising in migration of databases between database systems.

In some implementations, actions include providing, by a computer-executed migration advisor executing within a run-time of a source database system, a query data set including queries processed by the source database system during production use of the source database system, providing, by the computer-executed migration advisor, an object data set including data representative of database objects stored within a database of the source database system that are to be migrated for storage in a database of a target database system, generating, by the computer-executed migration advisor, a list of query-level features and a list of object-level features, each feature in the list of query-level features and each feature in the list of object-level features including a feature that is deprecated in the target database system relative to the source database system, resolving one or more issues represented by features of one or more of the list of query-level features and the list of object-level features, and executing migration of the database of the source database system to the database of the target database system.

To provide further context for implementations of the present disclosure, enterprises use database systems in support of operations. For example, enterprises store data within and access data from a database maintained within a database system and execute analytics on data within database systems. Vendors provide disparate offerings of database systems, which enterprises can choose from. Example offerings include, without limitation, on-premise database systems and cloud-based database systems. An on-premise database system can be described as being located within the physical confines of an enterprise (e.g., in a data center owned by and/or operated on behalf of an enterprise), is managed by the enterprise, and is generally capable of being tailored to the specific needs of the enterprise. A cloud-based database system can generally be described as being located within a cloud platform that is operated by a service provider and, in some cases, can have limited options available for tailoring to the needs of a particular enterprise.

On-premise database systems provide the highest level of configurability to the particular needs of enterprises. However, on-premise database systems place a heavier burden on enterprises in terms of managing the database system (e.g., dedicated internal information technology (IT) teams, deploying updates/upgrades/patches, maintaining infrastructure) than cloud-based database systems. This results in a higher total cost of ownership (TCO) for the enterprises than cloud-based systems. Further, cloud-based systems provide technical advantages over on-premise database systems in terms of maintenance, scalability, elasticity, and security, among others.

Within the class of cloud-based database systems, there are different paradigms available. Example paradigms include Infrastructure-as-a-Service (IaaS), Platform-as-a-Service (PaaS), and Database-as-a-Service (DaaS). In general, IaaS offers enterprises the most flexibility in tailoring the database systems to their needs (not considering on-premise), but provides the least flexibility in leveraging the technical advantages of cloud platforms. The PaaS paradigm offers enterprises reduced flexibility in tailoring the database system to their needs (as compared to IaaS), but provides improved flexibility in leveraging the technical advantages of cloud platforms (as compared to IaaS). The DaaS paradigm provides the least flexibility in tailoring the database systems to their needs (as compared to IaaS and PaaS), but provides the most flexibility in leveraging the technical advantages of cloud platforms (as compared to IaaS and PaaS).

In many instances, an enterprise may seek to migrate a database between database systems. For example, an enterprise can maintain a database within an on-premise database system, then choose to migrate the database to a cloud-based database system. As another example, an enterprise can maintain a database using a cloud-based IaaS database system, then choose to migrate the database to a cloud-based DaaS database system.

Migrating a database from one database system to another database system present numerous technical challenges. For example, even if the database systems are provided by the same vendor, incompatibilities are inherent between disparate types of database systems. An example incompatibility can include, without limitation, disparate features sets as between database systems. That is, for example, a source database system (i.e., a database system, from which a database is to be migrated) can have a feature set that is different than a feature set of a target database system (i.e., a database system, to which a database is to be migrated). For example, the feature set of the target database system can be absent features that are available in the feature set of the source database system (e.g., the feature set of the target database system is deprecated). This deprecation of the feature set of the target database system can result in queries that were executed in the source database system not being executable in the target database system. Other incompatibilities can include database objects available in the source database system not being available in the target database system.

In view of this, database migration can be assisted by a set of migration tools that assist users (e.g., IT personnel of an enterprise) in managing migration of a database from one database system to another database system. Traditional migration tools, however, rely on user input to the tools, the user input representing queries, database objects, and the like, of the database within the source database system. Such user input, however, can be incomplete and/or inaccurate, resulting in an inaccurate evaluation of any potential migration issues, which hinders the migration process. For example, an inaccurate view of potential migration issues results in some migration issues not being resolved before migration and having to be unwound post-migration. This comes at the expense of not only time, but technical resources in resolving the issues post-migration.

In view of the foregoing, and as introduced above, to a migration advisor for detection and resolution of issues arising in migration of databases between database systems. As described in further detail herein, the migration advisor of the present disclosure runs as part of the run-time of a database system (e.g., a source database system, a target database system). For example, the migration advisor is provided as a query command (e.g., SQL command) in the source database system. In this manner, the migration advisor is able to process actual workloads as executed in a source database system to identify migration issues pre-migration (before migration to the target database system is executed).

In some implementations, the migration advisor evaluates queries (e.g., provide as one or more query (SQL) statements) submitted to the source database system to determine whether a query statement of a query implicates a feature of the source database system that is deprecated in the target database system (i.e., is absent from the target database system). In some examples, the query statements are provided from one or more of a query string list, a query plan cache, and a workload capture. In some implementations, for a query statement that is determined to implicate a deprecated feature, the migration advisor executes query rewriting to provide a rewritten query that does not rely on the deprecated feature. Here, the rewritten query provides the same or sufficiently similar query result as the original query without relying on the deprecated feature. In some implementations, the migration advisor scans database objects within the source database to identify database objects having a feature deprecated in the target database system. In this manner, the migration advisor of the present disclosure provides for object-level migration issue evaluation.

Implementations of the present disclosure are described in further detail herein with reference to example cloud-based platforms and example database systems. An example database system includes SAP HANA provided by SAP SE of Walldorf Germany. SAP HANA can be described as an in-memory database system that uses main memory for data storage. An example cloud-based platform includes SAP HANA Cloud Platform, provided by SAP SE. SAP HANA Cloud Platform is provided as a PaaS system and can be described as an integration and extension platform that enables enterprises to connect landscapes and create application extensions based on respective enterprise needs and can be provisioned within an appropriate environment (e.g., Cloud Foundry, ABAP, Kyma). Another example cloud-based platform includes SAP HANA Cloud, provided by SAP SE. SAP HANA Cloud is provided as a DaaS system and can be described as a cloud-native platform that provides full capabilities to manage data storage, virtualization, and run powerful applications. It is contemplated, however, that implementations of the present disclosure can be realized with any appropriate database system and/or cloud-based platforms.

A database can be hosted within a source database system (e.g., SAP HANA Cloud Platform) and is to be migrated to a target database system (e.g., SAP HANA Cloud). For example, the database can include a version of SAP HANA for Cloud Foundry (or ABAP, or Kyma), and is to be migrated to a version of SAP HANA for cloud. In some examples, the source database system and the target database system include incompatibilities. That is, for example, the source database system includes features that are absent from (deprecated in) the target database system. For example, a PaaS system may include system and database configuration parameters that are user-modifiable. In contrast, a DaaS system is absent system and database configuration parameters or, if available, or not user-modifiable. In some examples, features can include query-level features and/or object-level features. Query-level features can include, for example, query statements. Object-level features can include, for example, types and/or attributes of database objects. Examples of each are discussed herein.

FIG. 1 depicts an example architecture 100 in accordance with implementations of the present disclosure. In the depicted example, the example architecture 100 includes a client device 102, a network 106, server systems 108, 110. Each of the server systems 108, 110 includes one or more server devices 112. In the depicted example, a user 112 interacts with the client device 102. In an example context, the user 112 can include a user, who interacts with an application that interacts with a database system hosted by the server system 108.

In some examples, the client device 102 can communicate with one or both of the server systems 108, 110 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 112 includes at least one server and at least one data store. In the example of FIG. 1, the server devices 112 are intended to represent various forms of servers including, but not limited to a web server, an application server, a proxy server, a network server, and/or a server pool. In general, server systems accept requests for application services and provides such services to any number of client devices (e.g., the client devices 102) over the network 106.

In some implementations, one or more data stores of the server systems store one or more databases. In some examples, a database can be provided as an in-memory database. In some examples, an in-memory database is a database management system that uses main memory for data storage. In some examples, main memory includes random access memory (RAM) that communicates with one or more processors, e.g., central processing units (CPUs), over a memory bus. An-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases.

Implementations of the present disclosure are described in further detail herein with reference to an example context. The example context includes applications that are executed on a client-server architecture, such as the example architecture 100 of FIG. 1. In some examples, applications can be provided in a suite that includes two or more applications. Example applications can include an enterprise resource planning (ERP) application, a customer relationship management (CRM) application, a supply chain management (SCM) application, and a product lifecycle management (PLM) application. It is contemplated, however, that implementations of the present disclosure can be realized in any appropriate context (e.g., healthcare applications). In some examples, an application interacts with a database system. For example, the application can read data from and/or write data to the database system. That is, an application can submit a query to the database system and receive a query result from the database system.

In accordance with implementations of the present disclosure, a source database system can be hosted in the server system 108 and a target database system can be hosted in the server system 110. For example, and without limitation, the source database system can be provided as a PaaS system and the target database system can be provided as a DaaS system. Continuing with the non-limiting examples above, a database can be provided within the source database system (e.g., SAP HANA Cloud Platform) provisioned within the server system 108. In some examples, an enterprise can operate using the database for a period of time (e.g., years) within the source database system. The enterprise can determine to migrate the database from the source database system to a target database system (e.g., SAP HANA Cloud) provisioned within the server system 110.

As introduced above, implementations of the present disclosure provide a migration advisor for pre-migration detection and resolution of issues arising in migration between database systems. As described in further detail herein, the migration advisor processes queries of the source database system to identify any query-level features of the source database system that are deprecated in the target database system, and scans database objects of the to-be-migrated database in the source database system to identify any object-level features of the source database system that are deprecated in the target database system.

Figure 2:
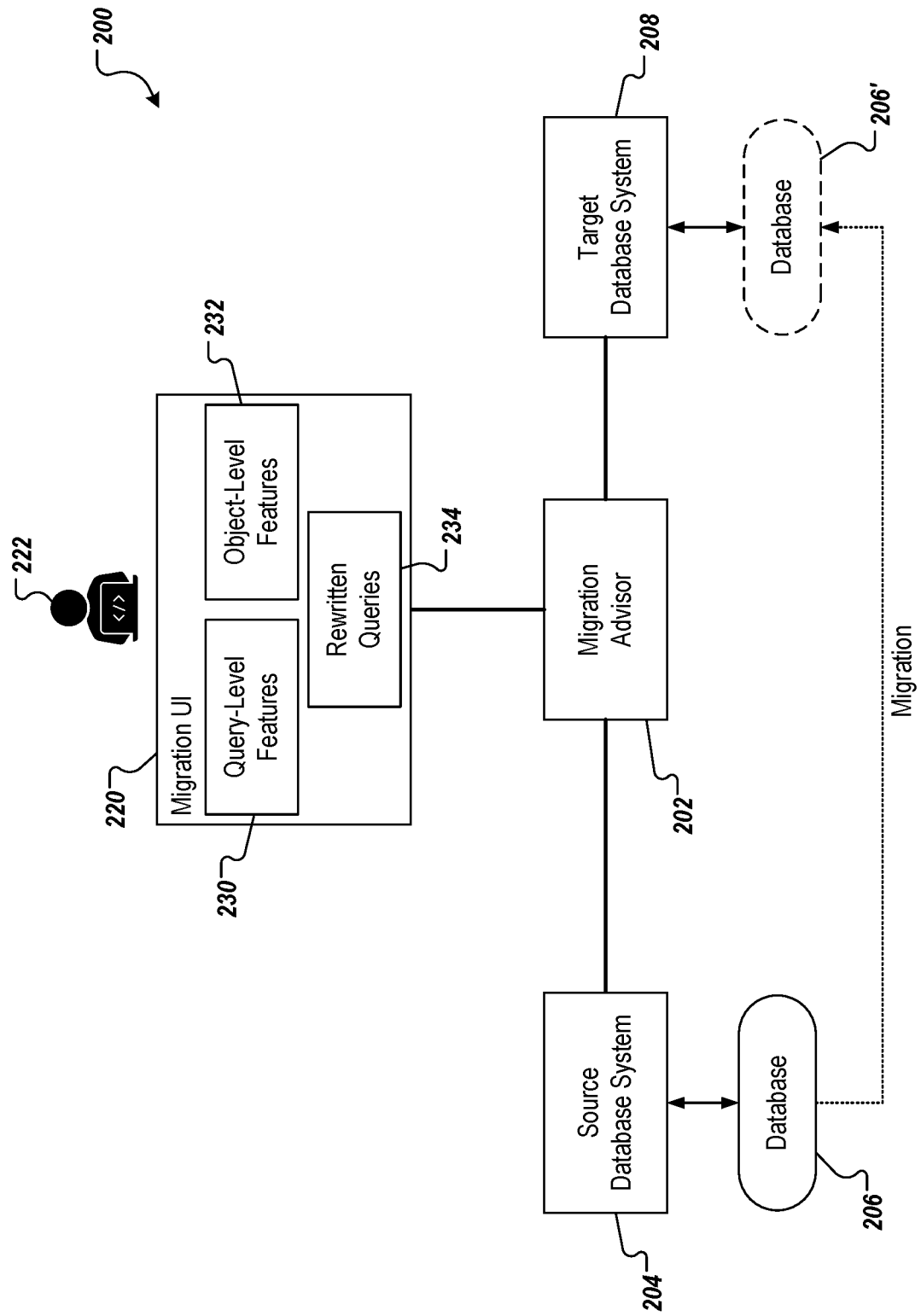
FIG. 2 schematically depicts at least a portion of a conceptual architecture for execution of a migration process in accordance with implementations of the present disclosure.

FIG. 2 schematically depicts at least a portion of a conceptual architecture 200 for execution of a migration process in accordance with implementations of the present disclosure. In the example of FIG. 2, the conceptual architecture 200 includes a migration advisor 202, a source database system 204, through which a database 206 is accessed, and a target database system 208, to which the database 206 is to be migrated as a database 206'. The representation of FIG. 2 is a pre-migration scenario, in which the database 206 has not yet been migrated to the target database system 208. Although depicted separately from the source database system 204, the migration advisor 202 can be executed within the runtime of the source database system 204. In this manner, the migration advisor 202 can monitor and evaluate queries submitted to the database 206 within the source database system 204 to identify any query-level features that may be impacted by migration of the database 206 to the target database system 208, as described in further detail herein. Further, the migration advisor 202 can scan data objects of the database 206 to identify any object-level features that may be impacted by migration of the database 206 to the target database system 208, as also described in further detail herein.

In some implementations, a migration user interface (UI) 220 is provided, which enables a user 222 (e.g., IT personnel of an enterprise) to interact with the migration advisor 202. For example, the migration UI 220 can display a list of object-level features 230 and a list of object-level features 232 that will be impacted by migration of the database 206 to the target database system 208. That is, each query-level feature and each object-level feature corresponds to a feature that is deprecated in the target database system 208. In some examples, a set of rewritten queries 234 is displayed within the migration UI 220, each rewritten query corresponding to a respective query-level feature to resolve deprecation of the query-level feature in the target database system 208. That is, for example, a rewritten query replaces a query executed in the source database system 204, which includes one or more query-level features in the list of query-level features. The rewritten query is absent the one or more query-level features, but still provides the same or sufficiently similar query result as the query and is executable within the target database system 208. The migration UI 220 can display other relevant information including, without limitation, statistics.

The source database system 204 processes queries to provide query results based on data stored within the database 206. For example, during production use, queries are processed by the source database system to provide query results to one or more requesting entities (e.g., users, applications). Production use of the source database system can be described as one or more applications (and/or users) executing queries on the source database system 206 during operations of the enterprise. Queries are submitted in a query language. An example query language includes, without limitation, the structured query language (SQL), which can be described as a standard database language that is used to create, maintain and retrieve data stored in a relational database (e.g., a database, in which data is stored in relational tables).

In general, query processing includes parsing using a parser, optimizing using an optimizer, and executing using an execution engine, each of which can be provided as one or more computer-executable programs. In further detail, the parser includes a syntax checker and a semantics checker. In some examples, the parser parses the query to define a data structure that enables further processing. In some examples, the data structure includes an abstract syntax tree (AST), which can be described as a tree representation of the abstract syntactic structure of the query written in a query language (e.g., SQL). The AST includes nodes, each node representing a query statement. The syntax checker processes the query to ensure that the query is syntactically correct (e.g., conforms to rules for syntactically correct queries). The semantics checker processes the query to ensure that the query is semantically correct. The semantics check can generally be described as determining whether a query statement is meaningful in terms of what is being requested from the database system. That is, for example, whether the data objects (e.g., tables, columns, views, procedures) in the statement actually exist within the database system. In some examples, the semantics checker also performs an authorization check to determine whether the entity (e.g., user) that submitted the query is authorized to access the data that would be returned by the query.

If the syntax check, the semantics check, and the authorization check are all passed (i.e., there is no syntax error, there is no semantics error, there is no authorization error), the AST of the query is provided to the optimizer, which provides a query execution plan (QEP). In some examples, the QEP is a list of programmatic instructions that are to be executed to provide the query result. In some examples, the QEP includes a number of operations, which can include, for example and without limitation, read and write operations. In general, the QEP defines the sequence in which tables are accessed, methods used to extract data from each table, and methods for computing calculations, filtering, aggregating, and/or sorting data from each table. In some examples, multiple QEPs could be executed to provide the query result. However, the optimizer outputs the QEP that is determined to be optimal (e.g., in terms of computing resources and memory expended to execute the QEP) among the multiple QEPs. For example, the optimizer can include a query rewriter to rewrite the QEP to provide the multiple QEPs, and resource consumption and/or time to execute can be evaluated for each QEP. The execution engine executes the QEP provided by the optimizer to provide the query result.

During production use of the source database system 204, queries processed by the source database system 204 can be recorded in a plan cache. In some examples, the plan cache stores QEPs of queries executed within the source database system 204 in the event that a query is received again. In this manner, the QEP can be retrieved from the plan cache to obviate the need to redetermine the QEP for the query, thereby conserving computing resources and improving the speed with which the respective query result is returned. In some examples, QEPs are stored in the plan cache for a certain period of time before they are removed (i.e., QEPs are not permanently persisted in the plan cache).

During production use of the source database system 204, a workload capture can be performed to capture a workload of the source database system 204. That is, multiple queries can be submitted to the source database system 204 over a period of time as a workload, and the workload can be captured (i.e., recorded). Subsequently, the workload can be replayed in a test environment, for example, to test an updated version of the source database system 204. In this manner, potential performance degradation, for example, can be evaluated prior to putting the update into production use. However, through the capture process, a set of queries and respective QEPs processed by the source database system 204 are made available.

Figure 3:
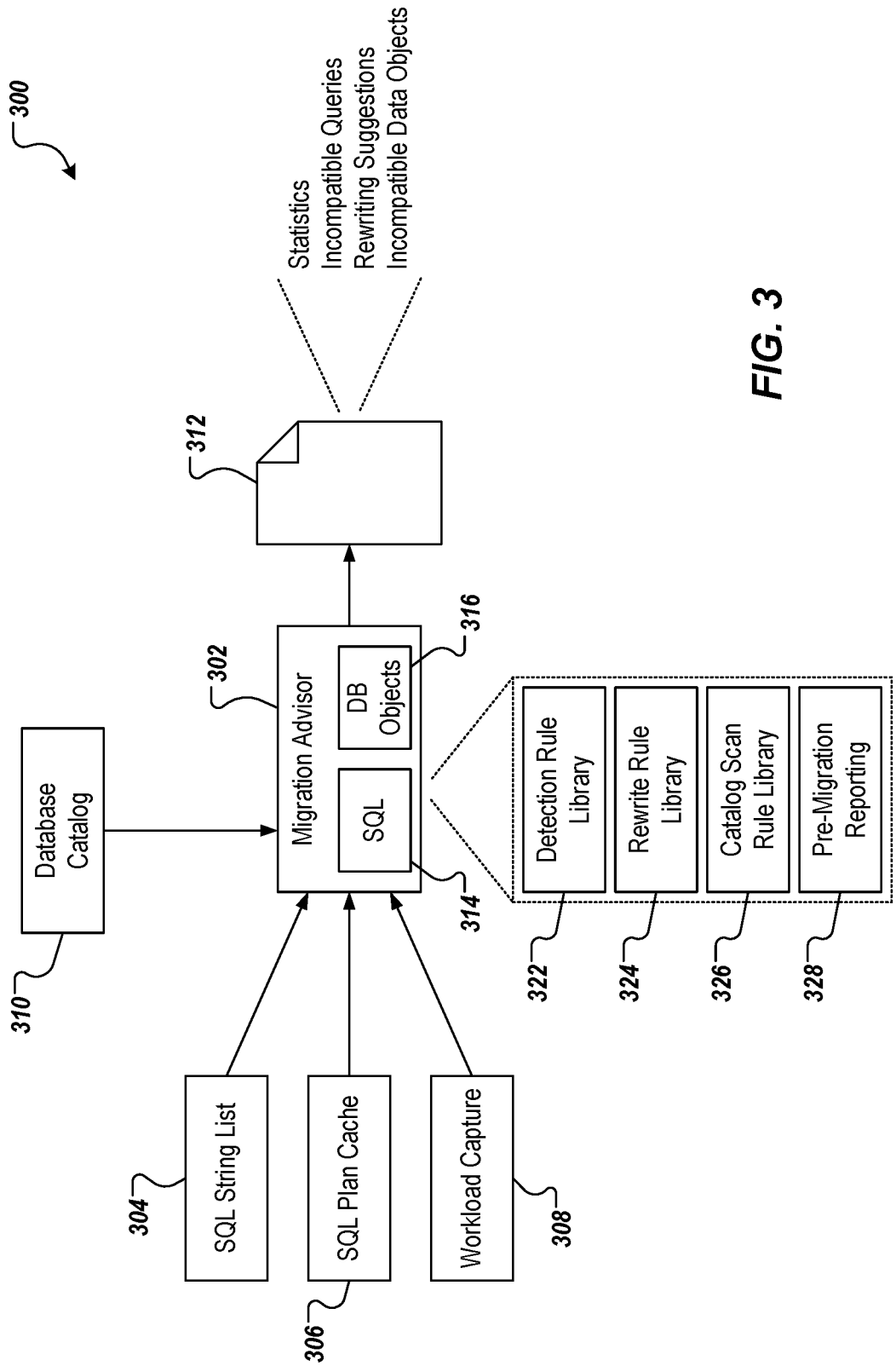
FIG. 3 schematically depicts data flow in accordance with implementations of the present disclosure.

FIG. 3 schematically depicts a data flow 300 accordance with implementations of the present disclosure. In the example of FIG. 3, the data flow 300 includes a migration advisor 302 that ingests data sets 304, 306, 308 and scans database objects recorded in a database catalog 310 to provide a migration report 312. In some examples, the migration advisor 302 includes a SQL migration advisor 314 and a database objects migration advisor 316. As described herein, the migration advisor 302 can be executed within a runtime of a source database system (e.g., at the migration advisor 202 executed within the runtime of the source database system 204 of FIG. 2). For example, the migration advisor 302 connects with the database (e.g., the database 206 of FIG. 2) to retrieve data that is representative of the source database system and workloads executed by the source database system and to read metadata representative of data objects stored within the database.

In some examples, the data sets 304, 306, 308 include data that is representative of the source database system and workloads executed by the source database system. In general, the data sets 304, 306, 308 collectively represent queries that are processed by the source database system during production use of the source database system. Accordingly, the migration advisor 302 can be said to scrape queries (query statements) executed by the source database system as the data sets 304, 306, 308.

In some examples, the data set 304 is a query string list that represents query statements (e.g., SQL statements) processed by the source database system to query the database. In some examples, the data set 304 is provided to the migration advisor 302 in response to receipt of a query. That is, the data set 304 is provided in real-time to the migration advisor 302, as the query is submitted. For example, an application (e.g., ERP application) can submit a query to the source database system and the query statements within the query can be provided, as the data set 304, to the migration advisor 202 in parallel with the query being processed by the source database system to provide a query result to the application. In some examples, the data set 304 includes the AST and the QEP generated by the source database system in processing the query.

In some examples, the data set 306 is a set of queries retrieved from a plan cache of the source database system. For example, and as described herein, queries executed by the source database system and/or the respective ASTs and QEPs generated by the source database system can be (temporarily) stored in a plan cache. The migration advisor 302 can periodically check the plan cache. In some examples, and the data set 308 is one or more workloads executed within the source database system. For example, and as described herein, a set of queries submitted to the source database system and/or the respective ASTs and QEPs can be recorded as a workload.

In some implementations, the migration advisor 302 can combine the data sets 304, 306, 308 to provide a query data set that is an inventory of queries processed by the source database system. For example, redundant queries can be removed, such that the primary data set includes unique queries processed by the source database system. In some examples, each query is associated with an identifier that uniquely identifies the query among all other queries. If multiple queries have the same identifier (e.g., a query that is stored in the plan cache and also included in the workload), only one of the queries is represented in the primary data set. In some examples, the primary data set records, for each query, the respective AST and QEP.

In some examples, the database catalog 310 stores metadata that defines data objects stored within a database (e.g., the database 206 of FIG. 2). Example data objects include, without limitation, base tables, views (virtual tables), synonyms, value ranges, indexes, users, and user groups. The database catalog 310 records attributes of each data object. Example attributes can include, without limitation, data types, field types (e.g., columns), among numerous others. In some examples, the migration advisor 302 reads the database catalog 310 to provide a object data set that is an inventory of all of the data objects stored in the database of the source database system and, for each data object, a list of attributes. The migration advisor 302 can periodically reads the database catalog 310.

In the example of FIG. 3, the migration advisor 302 includes a detection rule library 322, a rewrite rule library 324, a catalog scan rule library 326, and a pre-migration reporting module 328. In some examples, the detection rule library 322 is a set of computer-executable rules that can be used to evaluate queries in the query data set to determine whether any query implicates a feature that is deprecated in the target database system (i.e., is unavailable in the target database system). In some examples, the rewrite rule library 324 is a set of computer-executable rules that can be used to determine, which queries can be rewritten to provide respective rewritten queries, and to execute rewriting of the queries. In some examples, the catalog scan rule library 326 is a set of computer-executable rules that can be used to evaluate database objects of the database of the source database system to determine whether any database object implicates a feature that is deprecated in the target database system (i.e., is unavailable in the target database system). In some examples, the pre-migration reporting module 328 provides the migration report 312 based on output of each of the detection rule library 322, the rewrite rule library 324, and the catalog scan rule library 326.

In further detail, the migration advisor 302 processes the query data set through rules of the detection rule library 322 to identify any query-level features that are deprecated in the target database system. For example, for each query, the AST is considered and nodes of the AST, which represent individual query statements, are compared to the rules. In some examples, each rule in the detection rule library 322 corresponds to a query-level feature (e.g., query statement) that is absent in the target database system. Consequently, a query including the query-level feature, if executed within the target database system, would result in an error and no query result being provided in response to the query.

An example rule can include ALTER_SYSTEM, which identifies whether a query statement is an alter statement that is not supported by the target database system. Example alter statements that are not supported by the target database system can include, without limitation, ALTER SYSTEM {ADD|REMOVE} ABSTRACT SQL PLAN FILTER (which enables a plan filter to be added or removed), ALTER SYSTEM ALTER DATAVOLUME {ADD|DROP} PARTITION (which enables partitioning to be adjusted), and ALTER SYSTEM ENCRYPTION CONFIGURATION (which enables encryption to be adjusted). Another example rule can include CREATE_TABLE, which identifies whether a query statement is a table creation statement that is not supported by the target database system. Example table creation statements that are not supported by the target database system can include, without limitation, NO LOGGING RETENTION (which turns off logging) and SERIES ( . . . ) (which is used to provide series tables). These examples reflect limited flexibility in tailoring the target database system by the enterprise as compared to the source target database system.

In some implementations, if a query includes a query-level feature that has been deprecated in the target system, it can be determined whether the query can be rewritten to provide a query that can be executed in the target database system to provide the same or similar query result. In some examples, the rewritten query is absent the query-level feature identified by a respective rule. In some implementations, each rule can be associated with an indicator that indicates whether a query statement can be rewritten to remove the deprecated query-level feature. For example, if a query-level feature is identified by a rule as being deprecated in the target database system, it is determined whether the rule includes an indicator indicating that the query statement that includes the query-level feature can be rewritten. If the indicator is not present, no rewritten query is provided. If the indicator is present, a rewritten query is provided. If a query includes a query-level feature that is deprecated in the target database system, the query and query-level feature are included in the list of query-level features within the migration report 312. In some examples, if a rewritten query is available with respect to the query-level feature, the rewritten query is included in the list of rewritten queries within the migration report 312.

To illustrate query rewriting, an example query with an example deprecated features is referenced without limitation. The example query includes:

select /*+RESULT_CACHE_MAX_LAG(60)*/* from Employees;

which includes an inline SQL hint /*+RESULT_CACHE_MAX_LAG (60)*/. In this example, it can be determined that inline SQL hints are deprecated within the target database system. In this example, the query can be rewritten to provide the following example rewritten query:

select * from Employees with hint (RESULT_CACHE_MAX_LAG(60));

The migration advisor 302 processes the object data set through rules of the catalog scan library 324 to identify any object-level features that are deprecated in the target database system. In some examples, each rule in the detection rule library 322 corresponds to an object-level feature that is absent in the target database system. Consequently, a database object including the object-level feature, if migrated to the target database system, would result in an error.

For identifying object-level features, an example rule can include DETECT_CHAR_VARCHAR_CLOB, which identifies whether a database object includes any of the string data types CHAR, VARCHAR, and CLOB. For example, it can be provided that, while the source database system supports the string data types CHAR, VARCHAR, and CLOB, the target database system does not support the string data types CHAR, VARCHAR, and CLOB. Instead, for example, the target database system supports the string data types NCHAR, NVARCHAR, and NCLOB. As another example, it can be provided that, while the source database system supports particular column types in a view, the target database system does not support the particular column types. For example, a column type UNCOMPRESSED_SIZE and a column type COMPRESSION_RATIO_IN_PERCENTAGE of a view M_CS_COLUMNS and a view M_CS_ALL_COLUMNS are supported in the source database system, but are not supported in the target database system. Consequently, an example rule can include DETECT_COMPRESSION_COLUMNS, which determines whether a view of the object data set (determined from the database catalog of the source database system) includes either the column type UNCOMPRESSED_SIZE and the column type COMPRESSION_RATIO_IN_PERCENTAGE. If a view includes one of the column types, the view is identified in the list of object-level features within the migration report 312.

In accordance with implementations of the present disclosure, the list of query-level features and the list of object-level features can be used to resolve one or more issues that would result in migrating the database from the source database system to the target database system.

For example, and as described herein, a query-level feature is representative of a query statement that is deprecated in the target database system. Consequently, a resolution in view the query-level feature can include removing the query (or queries) that include the query statement from workloads that are to be processed by the target database system. In some examples, and as also described herein, a rewritten query can be provided. Consequently, a resolution can include replacing the original query with the rewritten query in workloads that are to be processed by the target database system.

As another example, and as described herein, an object-level feature can be representative of a data type that is deprecated within the target database system. Consequently, a resolution in view of the query-level feature can include changing the data type with a data type that is supported in the target database system (e.g., change CHAR to NCHAR, change VARCHAR to NVARCHAR, change CLOB to NCLOB). As another example, and as described herein, an object-level feature can be representative of a column of a view that is deprecated within the target database system. Consequently, a resolution in view of the query-level feature can include removing the column from the view (e.g., remove column type UNCOMPRESSED_SIZE from a view, remove column type COMPRESSION_RATIO_IN_PERCENTAGE from a view).

In accordance with implementations of the present disclosure, after any issues associated with query-level features and/or object-level features are resolved, the migration can be executed. In some examples, execution of the migration can include configuring a database (e.g., the database 206' within the target database system 208 of FIG. 2) and copying the database objects (including any changes) from the database of the source database system to the database of the target database system. In some examples, configuring the database can include, without limitation, configuring one or more tenants for shared database objects (e.g., HANA Deployment Infrastructure (HDI) containers to store design-time database objects and run-time database objects), and one or more tenants for secure storage of database objects.

Figure 4:
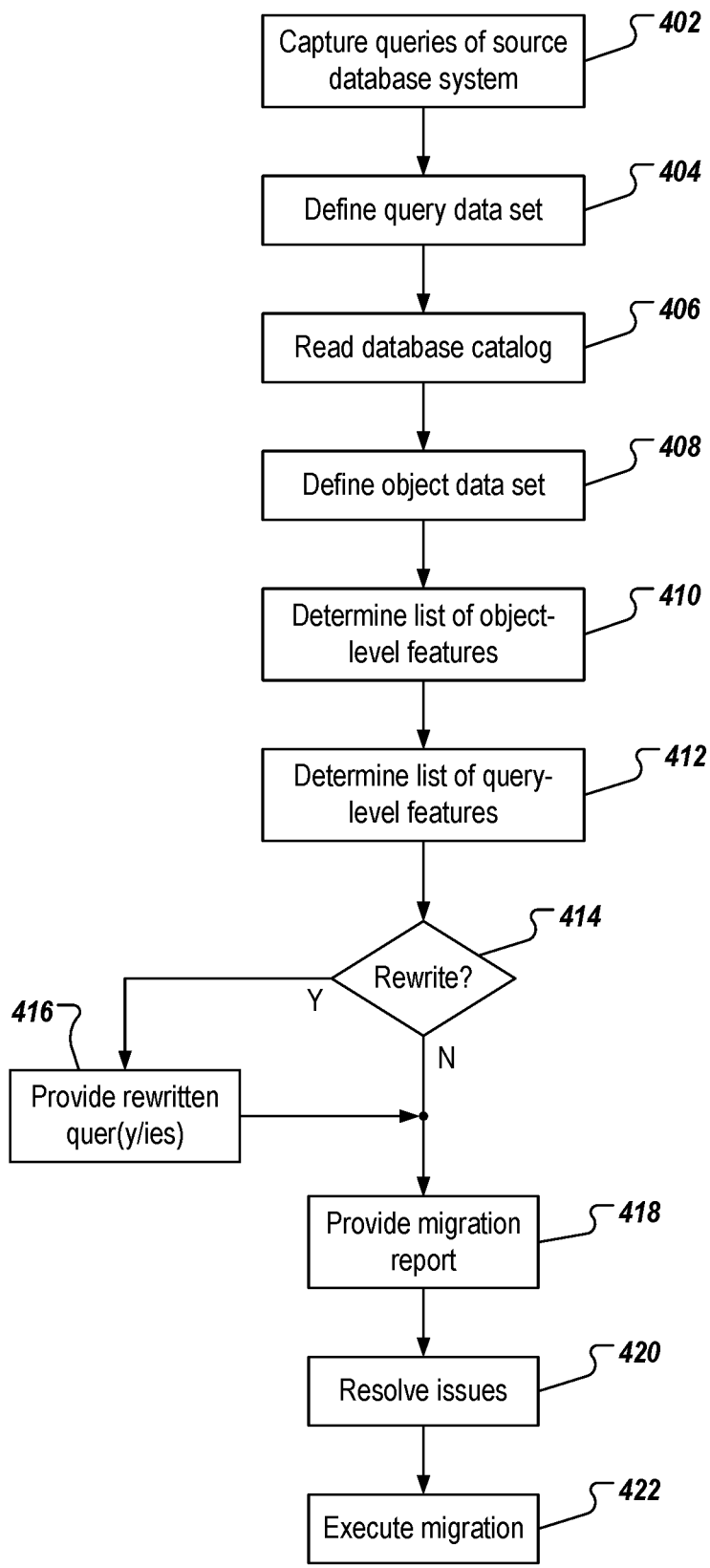
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices.

Queries of a source database system are captured (402). For example, and as described herein, queries can be received by the migration advisor 302 of FIG. 3, as they are submitted to the source database system. The queries are received as the data set 304. As another example, queries are received from a plan cache of the source database system. The queries are received as the data set 306. As another example, queries are received from one or more captured workloads recorded from the source database system. The queries are received as the data set 308. A query data set is defined (404). For example, and as described herein, queries of the data sets 304, 306, 308 can be combined and any redundant queries removed, such that the query data set includes unique queries processed by the source database system. A database catalog of the source database system is read (406) and an object data set is defined (408). For example, and as described herein, the migration advisor 302 reads the database catalog 310 to provide an object data set that includes an inventory of database objects stored within a database of the source database system.

A list of object-level features is defined (410). For example, and as described herein, the migration advisor 302 processes properties of database objects (e.g., data types, column types) through rules of the catalog scan rule library 326 to identify any features of the database objects of the source database system that are deprecated in the target database system and include such features in the list of object-level features. A list of query-level features is defined (412). For example, and as described herein, the migration advisor 302 processes statements of queries through rules of the detection rule library 322 to identify any features of the database objects of the source database system that are deprecated in the target database system and include such features in the list of query-level features.

It is determined whether the list of query-level features includes any queries that can be rewritten (414). For example, and as described herein, the migration advisor 302 processes query-level features in the list of query-level features through rules of the rewrite rule library 324 to identify queries that can be rewritten, if any. If it is determined that the list of query-level features includes one or more queries that can be rewritten, a rewritten query is provided for each such query-level feature (416). For example, and as described herein, a query rewriter of a QEP optimizer can process the query to provide a rewritten query.

A migration report is provided (418). For example, and as described herein, the migration advisor 302 provides the migration report 312, which can include the list of query-level features, the list of object-level features, and a list of rewritten queries, if available. One or more issues are resolved (420). For example, and as described herein, a resolution in view a query-level feature can include removing a query (or queries) that include a query statement from workloads that are to be processed by the target database system. In some examples, a resolution can include replacing an original query with a rewritten query in workloads that are to be processed by the target database system. In some examples, a resolution in view of an object-level feature can include changing a data type with a data type that is supported in the target database system. In some examples, a resolution in view of an object-level feature can include removing a column from a view. Migration is executed (422). For example, and as described herein, execution of the migration can include configuring a database (e.g., the database 206' within the target database system 208 of FIG. 2) and copying the database objects (including any changes) from the database of the source database system to the database of the target database system.

Figure 5:
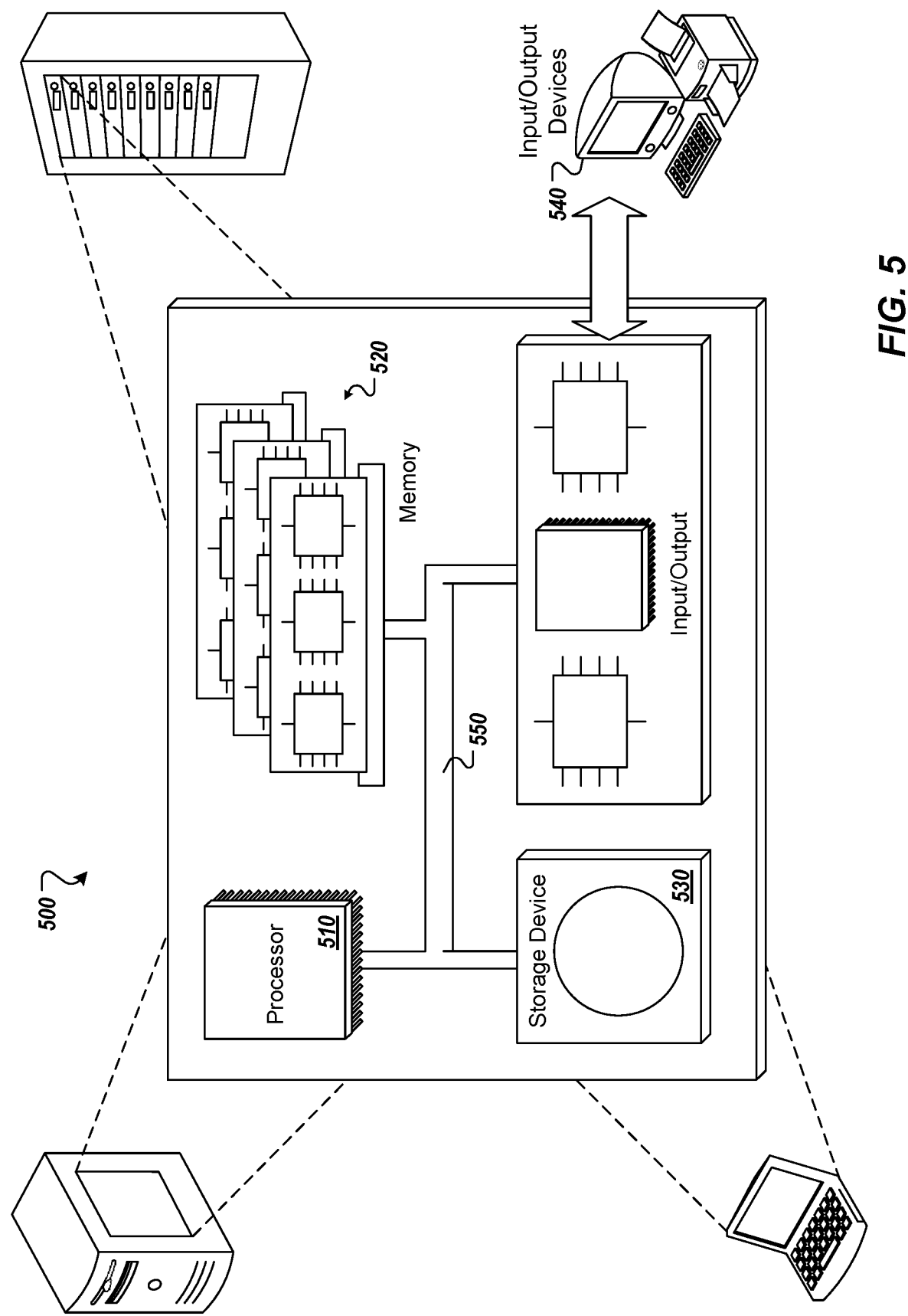
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for migration of one or more of database objects and one or more workloads from a source database system to a target database system, the method comprising:
providing, by a computer-executed migration advisor executing within a run-time of the source database system, a query data set comprising queries processed by the source database system during production use of the source database system;
providing, by the computer-executed migration advisor, an object data set comprising data representative of database objects stored within a database of the source database system that are to be migrated for storage in a database of the target database system;
generating, by the computer-executed migration advisor, a list of query-level features and a list of object-level features, each feature in the list of query-level features and each feature in the list of object-level features comprising a feature that is deprecated in the target database system relative to the source database system;
resolving one or more issues represented by features of one or more of the list of query-level features and the list of object-level features; and
executing migration of the database of the source database system to the database of the target database system.

2. The method of claim 1, wherein the query data set comprises queries received in one or more of real-time in response to execution, from a plan cache of the source database system, and from a workload of the source database system that has been recorded.

3. The method of claim 2, wherein, for each query, the query data set comprises one or more of an abstract syntax tree (AST) and a query execution plan (QEP) for the query.

4. The method of claim 1, further comprising, for at least one query in the query data set, generating a rewritten query that is absent a query-level feature that is deprecated in the target database system.

5. The method of claim 1, wherein generating, by the computer-executed migration advisor, a list of query-level features and a list of object-level features comprises processing queries of the query data set through one or more computer-executable rules that identify query-level features deprecated in the target database system, and processing queries of the query data set through one or more computer-executable rules that identify object-level features deprecated in the target database system.

6. The method of claim 1, wherein resolving one or more issues represented by features of one or more of the list of query-level features and the list of object-level features comprises one or more of:
removing a query from a workload that is to be processed by the target database system;
replacing a query with a rewritten query in a workload that is to be processed by the target database system;
changing a data type of a database object with a data type that is supported in the target database system; and
removing a column from a view.

7. The method of claim 1, wherein executing migration of the database of the source database system to the database of the target database system comprises configuring the database of the target database system and copying the database objects from the database of the source database system to the database of the target database system, the database object being absent object-level features in the list of object-level features.

8. A non-transitory computer-readable storage medium coupled to one or more processors and having instructions stored thereon which, when executed by the one or more processors, cause the one or more processors to perform operations for migration of one or more of objects and one or more workloads from a source database system to a target database system, the operations comprising:
providing, by a computer-executed migration advisor executing within a run-time of the source database system, a query data set comprising queries processed by the source database system during production use of the source database system;
providing, by the computer-executed migration advisor, an object data set comprising data representative of database objects stored within a database of the source database system that are to be migrated for storage in a database of the target database system;
generating, by the computer-executed migration advisor, a list of query-level features and a list of object-level features, each feature in the list of query-level features and each feature in the list of object-level features comprising a feature that is deprecated in the target database system relative to the source database system;
resolving one or more issues represented by features of one or more of the list of query-level features and the list of object-level features; and
executing migration of the database of the source database system to the database of the target database system.

9. The non-transitory computer-readable storage medium of claim 8, wherein the query data set comprises queries received in one or more of real-time in response to execution, from a plan cache of the source database system, and from a workload of the source database system that has been recorded.

10. The non-transitory computer-readable storage medium of claim 9, wherein, for each query, the query data set comprises one or more of an abstract syntax tree (AST) and a query execution plan (QEP) for the query.

11. The non-transitory computer-readable storage medium of claim 8, wherein operations further comprise, for at least one query in the query data set, generating a rewritten query that is absent a query-level feature that is deprecated in the target database system.

12. The non-transitory computer-readable storage medium of claim 8, wherein generating, by the computer-executed migration advisor, a list of query-level features and a list of object-level features comprises processing queries of the query data set through one or more computer-executable rules that identify query-level features deprecated in the target database system, and processing queries of the query data set through one or more computer-executable rules that identify object-level features deprecated in the target database system.

13. The non-transitory computer-readable storage medium of claim 8, wherein resolving one or more issues represented by features of one or more of the list of query-level features and the list of object-level features comprises one or more of:
removing a query from a workload that is to be processed by the target database system;
replacing a query with a rewritten query in a workload that is to be processed by the target database system;
changing a data type of a database object with a data type that is supported in the target database system; and
removing a column from a view.

14. The non-transitory computer-readable storage medium of claim 8, wherein executing migration of the database of the source database system to the database of the target database system comprises configuring the database of the target database system and copying the database objects from the database of the source database system to the database of the target database system, the database object being absent object-level features in the list of object-level features.

15. A system, comprising:
a computing device; and
a computer-readable storage device coupled to the computing device and having instructions stored thereon which, when executed by the computing device, cause the computing device to perform operations for migration of one or more of objects and one or more workloads from a source database system to a target database system, the operations comprising:
providing, by a computer-executed migration advisor executing within a run-time of the source database system, a query data set comprising queries processed by the source database system during production use of the source database system;
providing, by the computer-executed migration advisor, an object data set comprising data representative of database objects stored within a database of the source database system that are to be migrated for storage in a database of the target database system;
generating, by the computer-executed migration advisor, a list of query-level features and a list of object-level features, each feature in the list of query-level features and each feature in the list of object-level features comprising a feature that is deprecated in the target database system relative to the source database system;

resolving one or more issues represented by features of one or more of the list of query-level features and the list of object-level features; and executing migration of the database of the source database system to the database of the target database system.

16. The system of claim 15, wherein the query data set comprises queries received in one or more of real-time in response to execution, from a plan cache of the source database system, and from a workload of the source database system that has been recorded.

17. The system of claim 16, wherein, for each query, the query data set comprises one or more of an abstract syntax tree (AST) and a query execution plan (QEP) for the query.

18. The system of claim 15, wherein operations further comprise, for at least one query in the query data set, generating a rewritten query that is absent a query-level feature that is deprecated in the target database system.

19. The system of claim 15, wherein generating, by the computer-executed migration advisor, a list of query-level features and a list of object-level features comprises processing queries of the query data set through one or more computer-executable rules that identify query-level features deprecated in the target database system, and processing queries of the query data set through one or more computer-executable rules that identify object-level features deprecated in the target database system.

20. The system of claim 15, wherein resolving one or more issues represented by features of one or more of the list of query-level features and the list of object-level features comprises one or more of:

removing a query from a workload that is to be processed by the target database system;

replacing a query with a rewritten query in a workload that is to be processed by the target database system;

changing a data type of a database object with a data type that is supported in the target database system; and removing a column from a view.

* * * * *